(12) United States Patent
Harazi et al.

(10) Patent No.: US 11,822,724 B2
(45) Date of Patent: Nov. 21, 2023

(54) METHOD AND DEVICE FOR PRODUCING A KEY-CLICK EFFECT ON A HAPTIC INTERFACE

(71) Applicant: HAP2U, Saint Martin d'Hères (FR)

(72) Inventors: Maxime Harazi, Saint Martin d'Hères (FR); Mathieu Rupin, Saint Martin d'Hères (FR)

(73) Assignee: HAP2U, Saint Martin d'Hères (FR)

( * ) Notice: Subject to any disclaimer, the term of this patent is extended or adjusted under 35 U.S.C. 154(b) by 62 days.

(21) Appl. No.: 17/635,204

(22) PCT Filed: Sep. 3, 2020

(86) PCT No.: PCT/FR2020/000232
§ 371 (c)(1),
(2) Date: Feb. 14, 2022

(87) PCT Pub. No.: WO2021/044085
PCT Pub. Date: Mar. 11, 2021

(65) Prior Publication Data
US 2022/0291748 A1   Sep. 15, 2022

(30) Foreign Application Priority Data

Sep. 3, 2019 (FR) ..................................... 19 09660

(51) Int. Cl.
*G06F 3/0488* (2022.01)
*G06F 3/041* (2006.01)
*G06F 3/01* (2006.01)

(52) U.S. Cl.
CPC .............. *G06F 3/016* (2013.01); *G06F 3/041* (2013.01)

(58) Field of Classification Search
None
See application file for complete search history.

(56) References Cited

U.S. PATENT DOCUMENTS 7,159,008 B1 * 1/2007 Wies ................ G06Q 10/06311
709/227
2012/0256848 A1   10/2012 Madabusi Srinivasan
(Continued)

FOREIGN PATENT DOCUMENTS

WO   2019141919 A1   7/2019

OTHER PUBLICATIONS

International Search Report (PCT/ISA/210) with English translation and Written Opinion (PCT/ISA/237) dated May 7, 2021, by the European Patent Office as the International Searching Authority for International Application No. PCT/FR2020/000232.

*Primary Examiner* — Carl Adams
(74) *Attorney, Agent, or Firm* — BUCHANAN INGERSOLL & ROONEY PC

(57) ABSTRACT

A method for producing a haptic-feedback effect via a squeeze-film effect on a haptic interface equipped with electromechanical actuators configured to apply ultrasonic vibrations able to create standing waves, includes determining a subset of resonant frequencies fi of the haptic interface in the ultrasonic domain; defining a haptic sequence consisting of an electrical excitation signal s(t) formed from a succession of at least two periodic signals having frequencies fi, fj that are different from each other and that belong to said subset of resonant frequencies detecting a static touching action of a user on a region of a surface of the haptic interface; and exciting the electromechanical actuators using said electrical excitation signal s(t), so as to achieve a transition from a first standing wave to a second standing wave, so as to produce, on the haptic surface, lateral forces that cause the user to feel a key-click sensation.

13 Claims, 4 Drawing Sheets

(56) References Cited

U.S. PATENT DOCUMENTS

2018/0107378 A1* 4/2018 Rosenberg .......... G06F 3/04144
2021/0232308 A1* 7/2021 Cruz Hernandez ..........................
G06F 3/04886

* cited by examiner

METHOD AND DEVICE FOR PRODUCING A KEY-CLICK EFFECT ON A HAPTIC INTERFACE

FIELD OF THE INVENTION

The invention relates to the production of a so-called "key-click" effect on a haptic interface by virtue of the use of standing mechanical waves in the ultrasonic domain.

Within the context of the present invention, by "key click" what is meant is a haptic-feedback effect generated by a haptic interface when a user places one (or more than one) finger(s) on said interface in a static manner, i.e. without swiping his finger (or fingers) laterally over the surface: this action is referred to as a "static touching" action. In other words, the key-click effect must be felt as soon as the user presses on the surface of the haptic interface along an axis substantially normal to the surface, without any lateral movement, i.e. movement tangential to the plane of the interface surface.

PRIOR ART

A number of ways of achieving a key-click effect on touch interfaces devoid of tangible physical keys, such as for example the touch screens of cellphones, are already known.

The most conventional way of providing a user with a key-click sensation on a touch interface is to use so-called "vibrotactile" technology, which consists in making the entire touch interface vibrate at low frequency (~50-1000 Hz) and with a high amplitude, of the order of 1 millimeter (mm).

A number of methods for generating such low-frequency, high-amplitude vibrations on a haptic interface have been described, and in particular the use of a plurality of electromagnet-based actuators.

Such an approach has in particular been described in the document H. Chen, J. Park, S. Dai, and H. Z. Tan. Design and Evaluation of Identifiable Key-Click Signals for Mobile Devices. IEEE Transactions on Haptics 4, no 4 (October 2011): 229-41. This method has a number of drawbacks. In particular, the movement of the surface of the interface must be of high amplitude, of the order of 25 microns, if the user is to feel a key-click effect. Obtaining such an amplitude requires a lot of electrical power and a high-spec power-supply circuit. Furthermore, the key-click effect felt is highly dependent on the way in which the finger touches the haptic interface.

Moreover, another type of haptic feedback may be obtained, which allows artificial textures to be created using the squeeze-film effect such as described in the following publication: T. Watanabe, S. A. Fukui. A Method for Controlling Tactile Sensation of Surface Roughness Using Ultrasonic Vibration, IEEE Conference on Robotics and Automation, pp. 1134-1139, 1995. The squeeze-film effect consists in increasing the pressure under the finger of a user interacting with a surface. This increased pressure is the consequence of the non-linear response of the air trapped in the furrows of fingerprints to a high-amplitude mechanical wave propagating over the surface. This increased pressure creates a force normal to the touch surface, opposite to the pressing force exerted by the finger, this allowing the coefficient of friction to be decreased. Since the propagation times of ultrasound over rigid surfaces are very short, this approach allows the coefficient of friction between the finger and the surface to be controlled in real time. However, since this coefficient is the root cause of our perception of the texture of a surface, it is thus possible to cause artificial textures to be felt. In contrast, as this effect mainly acts on the coefficient of friction, it is very difficult to use it to create haptic feedback when the finger just makes static contact with the touch surface and is not moved laterally with respect thereto.

Recently, a number of attempts have been made to create key-click sensations with ultrasonic vibrations. Specifically, one example of production of a haptic-feedback effect triggered by the press of a finger and based on the squeeze-film effect is described in the document by Monnoyer, Jocelyn, Emmanuelle Diaz, Christophe Bourdin, and Michael Wiertlewski, titled "Ultrasonic Friction Modulation While Pressing Induces a Tactile Feedback", published in In HAPTICS: PERCEPTION, DEVICES, CONTROL, AND APPLICATIONS, EUROHAPTICS 2016, PT I, edited by F. Bello, H. Kajimoto, and Y. Visell, 9774: 171-79. Lecture Notes in Computer Science. GEWERBESTRASSE 11, CHAM, CH-6330, Switzerland: SPRINGER INT PUBLISHING AG, 2016. In this case the haptic-feedback effect is produced using various actuators that all emit identical standing waves at one frequency. This allows a key-click effect to be obtained, but it is very weak and extremely sensitive to the way in which the finger is placed on the haptic surface, and in particular to the angle made between the finger and the haptic surface.

Another approach is described in document US 2012/0256848 A1, which describes a way of obtaining haptic feedback, and in particular a click effect, on a touch surface actuated at a frequency, in particular an ultrasonic frequency, by actuators that may in particular be piezoelectric actuators. However, in this document, if a haptic-feedback effect is to be obtained the finger cannot remain static, but on the contrary must make a swiping movement over the touch surface. Furthermore, the amplitudes of the obtained haptic feedback may range up to 100 to 150 micrometers, this indicating that the vibratory effect used is not a squeeze-film effect in the ultrasonic domain. To compensate for the expenditure of energy required to obtain these high amplitudes, the cited document proposes to excite the touch surface at a resonant frequency. However, provision is not made in the document to identify a set of a plurality of resonant frequencies with a view to forming an excitation signal using only the frequencies of this set. Therefore, the document does not teach the use of a plurality of standing waves. Ultimately, it does not describe any click effect in response to a static touch, or a plurality of resonant frequencies excited in sequence.

Another example of a key click produced with ultrasound is described in the document by K. Tashiro, Y. Shiokawa, T. Aono, and T. Maeno titled "Realization of button click feeling by use of ultrasonic vibration and force feedback". In World Haptics 2009—Third Joint EuroHaptics conference and Symposium on Haptic Interfaces for Virtual Environment and Teleoperator Systems, 1-6, 2009. This method uses a "Langevin" piezoelectric actuator excited at a set frequency of about 28 kHz and with an amplitude of about 20 μm, which again causes problems with respect to the supply of power.

Lastly, another method for producing a key-click effect using ultrasonic vibrations is described in the document by Gueorguiev, David, Anis Kaci, Michel Amberg, Frédéric Giraud, and Betty Lemaire-Semail, titled "Travelling Ultrasonic Wave Enhances Keyclick Sensation", published in Haptics: Science, Technology, and Applications, edited by Domenico Prattichizzo, Hiroyuki Shinoda, Hong Z. Tan, Emanuele Ruffaldi, and Antonio Frisoli, 302-12. Lecture Notes in Computer Science. Springer International Publishing, 2018. This method uses an ultrasonic motor based on travelling waves. Once again, the actuators receive a single, but phase-shifted, excitation frequency, this creating a travelling wave in the medium. The click sensation obtained is very strong, but it requires a high density of actuators (in fact the contact surface is entirely covered with actuators), this making integration thereof very difficult from an industrial point of view and at a reasonable cost. In addition, the method described in this publication uses a very special configuration of the actuators since it is a question of a 1D ring entirely covered with actuators.

In summary, known methods employing ultrasonic vibrations encourage use of ultrasonic waves at one set frequency. The main drawbacks are the weakness of the haptic feedback felt, and the high dependence on the way in which the finger is placed on the interface.

Aim of the Invention

The general aim of the present invention is in particular to provide a new method for generating a key-click effect on a haptic interface, that is free from the drawbacks and limitations of the known methods summarized above.

One specific other aim of the invention is to provide a method that uses ultrasonic frequencies to control the actuators, while generating a stronger haptic effect than obtained with known methods using modulation of the squeeze-film effect, and while requiring a lower power than known systems.

The key-click effect obtained must also be more robust, and in particular less sensitive to the way in which the user places his finger on the haptic medium.

Moreover, the invention aims to produce a "true" key click, providing a natural sensation very close to the sensation of a conventional tangible key, and in particular a click effect obtained in response to a touch in a direction substantially normal to the touch surface, the finger not being required to make a swiping movement tangentially to the surface.

Lastly, the method provided by the invention must be easy to implement from a practical and industrial point of view, and in particular must not require a high density of actuators on the touch surface.

SUMMARY OF THE INVENTION

In principle, the invention consists of a method that allows a key-click sensation to be obtained on a haptic interface equipped with one or more ultrasonic transducers placed in various locations on the interface. According to this method, instead of subjecting the haptic medium to a standing wave of set frequency corresponding to a resonant frequency of the medium, as taught in the prior art, the invention makes provision to apply, to the medium, a haptic sequence consisting of at least two successive ultrasonic standing waves of different frequencies.

The invention thus teaches that using two different frequencies shaped in a particular way in a sequence allows, on the change in frequency, a more realistic and more perceptible key-click effect to be felt under a finger of the user, in response to a static touch of the haptic interface by the user.

One subject of the invention is therefore a method for producing a haptic-feedback effect via the so-called squeeze-film effect on a haptic interface equipped with electromechanical actuators that are configured to apply, to said haptic interface, ultrasonic vibrations able to create standing waves, characterized in that it comprises steps of:
  a. in a preliminary phase of characterization of the haptic interface, determining a subset ($\Omega$) of resonant frequencies $f_i$ of the haptic interface in the ultrasonic domain;
  b. defining a haptic sequence consisting of an electrical excitation signal s(t) formed from a succession of at least two periodic signals having frequencies $f_i$, $f_j$ that are different from each other and that belong to said subset ($\Omega$) of resonant frequencies of the haptic interface;
  c. in a phase of use, detecting a static action of a user touching a region of a surface of the haptic interface;
  d. in response to said detection, exciting the electromechanical actuators using said electrical excitation signal s(t), so as to achieve a transition from a first standing wave to a second standing wave, so as to produce, on the haptic surface, lateral forces that cause the user to feel a key-click sensation.

Preferably, the standing waves applied to the haptic interface are plane waves.

According to one embodiment of the invention, the periodic signals are sinusoidal, square-wave or triangle-wave signals, having an identical amplitude or amplitudes that are differentiated, for example by convolution with a Gaussian signal inter alia.

According to one embodiment, the electrical excitation signal s(t) is of finite duration $t_2$ and is composed of a first periodic wave train of duration $t_1$ and of frequency $f_i$ corresponding to a first resonant frequency of the medium, followed by a second periodic wave train of duration $t_2-t_1$ and of frequency $f_j$ corresponding to a second resonant frequency of the medium, which second resonant frequency is different from the first resonant frequency $f_1$.

Advantageously, the durations $t_1$ and $t_2-t_1$ are comprised between 0.1 ms and 10 ms.

According to one embodiment, two successive wave trains of the signal s(t) are separated by a dead time without excitation, of a duration comprised between 0.1 ms and 15 ms.

Advantageously, the amplitude of the periodic signals is chosen so that the amplitude of the mechanical vibration corresponding to the generated key-click effect is about 1 micrometer or preferably less than 3 micrometers.

According to one variant of embodiment, the haptic sequence comprises a plurality of frequency transitions, this allowing the perception of the key click by the user to be further personalized.

According to one embodiment of the invention, the haptic interface has a touch surface and the step of detecting an action of the user consists in detecting the contact of the finger on the touch surface and in triggering the transmission of the haptic sequence when the finger of the user makes contact with said surface.

According to one variant of embodiment, the haptic interface comprises contact-force sensors and the step of detecting an action of the user consists in measuring the pressing force of the finger of the user and in triggering the transmission of the haptic sequence when the normal force exerted by the finger on the surface of the haptic interface exceeds a certain predetermined threshold value.

The key-click effect generated using the method according to the invention is such that the feeling felt by the user is substantially identical to the feeling felt by the user in response to pressing on a tangible physical key, i.e. applying pressure with the finger in a direction normal to the surface of the haptic medium, no lateral movement of the finger being required on the part of the operator.

Another subject of the invention is a haptic interface comprising a medium having a surface capable of providing haptic feedback to a user acting on this surface by means of at least one finger, said medium being subjected to ultrasonic vibrations generated by electromechanical actuators fastened to said medium in response to electrical control signals sent to the actuators by control electronics, characterized in that the control electronics are configured to generate an electrical excitation signal s(t) according to the method described above.

According to one practical embodiment, the electromechanical actuators are piezoelectric ceramics that transmit periodic vibrations at frequencies comprised between 20 kHz and 200 kHz.

According to one embodiment, the haptic interface may comprise a parameterization interface that allows the user to choose system parameters such as the waveform of the periodic signals, pairs of frequencies ($f_i$, $f_j$) or triplets or more generally multiplets of resonant frequencies, the duration of time windows of the haptic sequence and/or the duration of any dead time between two wave trains, and to test the influence of the various parameters on the quality of the obtained key-click effect.

DETAILED DESCRIPTION

The invention will be described in more detail with reference to the figures, in which:

FIG. 1 is a graph showing the average amplitude of movement of the surface of a haptic interface at various applied vibration frequencies;

FIG. 2 schematically shows the response of a haptic interface excited according to the method according to the invention, during a static touch of a finger of a user;

Figure 1:
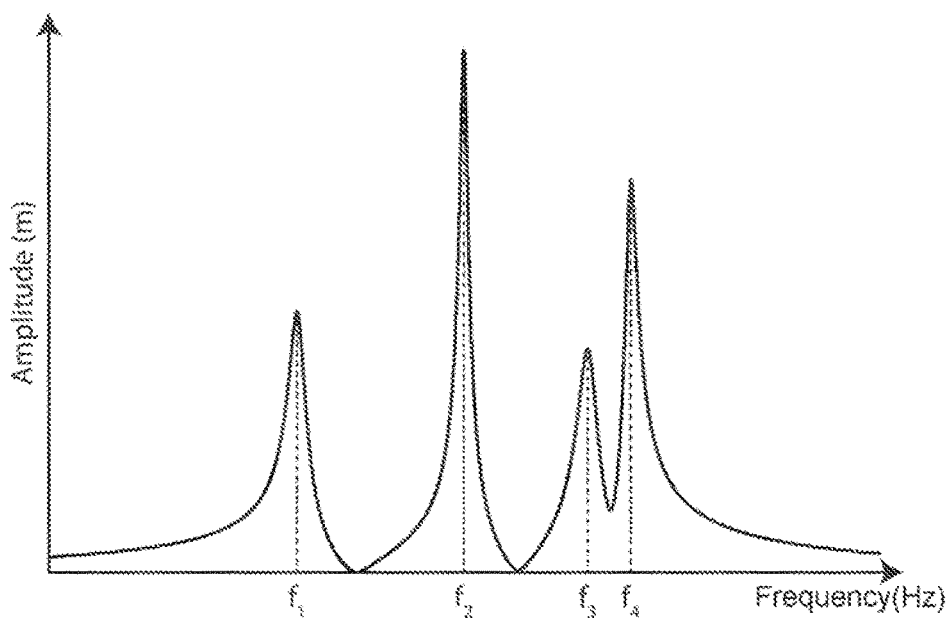

The reader is referred to FIG. 1, which illustrates the first step of the method according to the invention. This step consists in characterizing the vibratory properties of the haptic interface, to determine the resonant frequencies (in Hertz, denoted Hz) thereof. To do this, the vibratory amplitude of the interface (in meters, denoted m) obtained at various vibratory frequencies applied using electromechanical transducers is measured. A curve such as that shown in FIG. 1, exhibiting a series of amplitude peaks corresponding to resonant frequencies f1, f2, etc. is therefore obtained. A subset of these resonant frequencies is denoted Ω. For the sake of simplicity, only the first 4 resonant frequencies have been shown.

It will be noted that the characterizing step 10 may be carried out once and for all at the start of operation or when the device is switched on, or carried out repetitively and dynamically on each interaction with the user, for example so as to take into account in real time changes in resonant frequencies as a function of external parameters, such as ambient temperature.

In practice, this characterizing step may be carried out using a laser vibrometer to measure the amplitude of the vibration of the haptic interface, or potentially using an impedance meter, which however is less accurate. Each resonant frequency is associated with one amplitude. The higher the amplitude associated with a mode of vibration, the easier it will be to obtain a substantial movement of the haptic interface.

In the context of the present invention, by key-click effect, such as felt by the user, what is meant is a haptic-feedback effect that is felt through the fingertips of the user, and that has the following properties:

Associated gesture: the key-click sensation must be felt in response to a specific gesture of the user, namely a gesture equivalent to that of an operator pressing on a tangible physical key, i.e. a static press of the finger (or fingers) in a direction substantially normal to the surface of the haptic medium, no lateral movement of the finger being required on the part of the operator.

Brevity: the typical duration of the targeted haptic feedback is of the order of 5 ms, although it may be a little shorter or a little longer.

Perception: the perception of the haptic feedback must be marked and procure a sensation similar to pressing on a tangible 3D key.

In order to obtain a key-click effect such as defined above, the invention makes provision to equip the haptic interface with a series of electromechanical actuators, piezoelectric ceramics for example, and to apply, to these actuators, a specific haptic sequence in response to the static touch of the finger of the user on the haptic surface.

In the context of the present invention, by "haptic sequence" what is meant is the (amplitude and frequency) profile (during a time window) of the electrical signal s(t) used to excite the one or more actuators in response to an action of the operator, typically him touching the interface.

Figure 2:
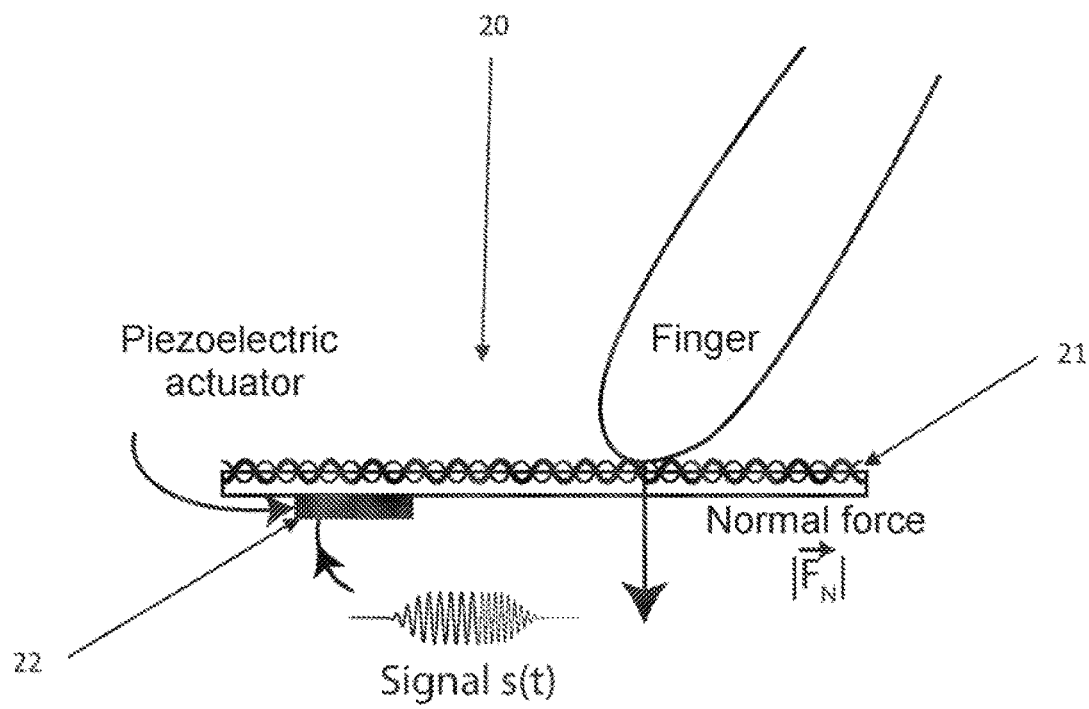

The operating mode is schematically shown in FIG. 2. A touch interface 20 (cross-sectional view) is vibrated by piezoelectric actuators 22 that are excited by an electrical excitation signal denoted s(t). A user places a finger (or a plurality of fingers, or a stylus or equivalent) statically on the surface 21 of the touch interface 20, thereby exerting a contact force normal to the surface of the touch interface, this force being denoted $F_N$. By virtue of the haptic sequence caused by the electrical excitation signal s(t), the surface 21 of the touch interface is vibrated at resonant frequencies belonging to the subset Ω. The standing waves excited at two successive resonant frequencies have been schematized, one by a thin line, the other by a thick line. They generate lateral forces tangential to the surface 21 and exerted on the pad of the finger of the user, who consequently will perceive under his finger a key-click effect.

Figure 3:
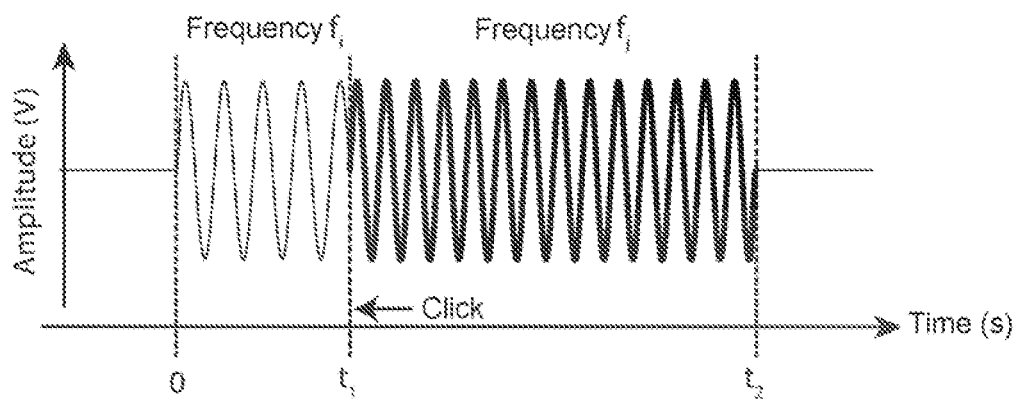
FIG. 3 is a graph of amplitude as a function of time and frequency according to a first variant of the electrical excitation signal transmitted by the ultrasonic actuators to the haptic medium.

A first example of a haptic sequence is shown in FIG. 3. Unlike known methods which excite the actuators at a single resonant frequency of the medium, the haptic sequence used by the method according to the invention uses at least two different excitation frequencies, corresponding to resonant frequencies determined during the step of characterizing the haptic interface. Specifically, it has surprisingly been observed that a key-click effect such as defined above is generated at the moment of the change in excitation frequency.

More precisely, with the change in frequency, the vibration of the haptic interface passes from a first standing mode to a second standing mode. This change in vibratory mode creates a movement of the network of nodes and antinodes of the haptic interface. This movement of the network of nodes and antinodes in turn creates transient lateral forces on the haptic interface. These lateral forces are felt by the user through his finger while it is pressed statically in a direction substantially normal to the haptic surface. These transient (and therefore brief) lateral forces tangential to the surface are then perceived by the user through his finger as a key-click effect.

In order to maximize the key-click effect perceived by the user, it has been established that the exciting standing waves may preferably have a half-wavelength (namely the distance between a neighboring vibration node and antinode) less than the contact area of the finger on the haptic interface.

As shown by the example of FIG. 3, the electrical excitation signal s(t) (corresponding to the haptic sequence) of duration $t_2$ is composed of a first, in particular sinusoidal, periodic wave train of duration $t_1$ and of frequency $f_i$ corresponding to a first resonant frequency of the medium, followed by a second, periodic, in particular sinusoidal, wave train of duration $t_2-t_1$ and of frequency $f_j$ corresponding to a second resonant frequency of the medium, which second resonant frequency is different from the first resonant frequency.

In the example shown, the amplitude of the electrical excitation signal, measured in volts (V), remains constant.

According to one practical embodiment, the durations $t_1$ and $t_2-t_1$ are typically comprised between 1 millisecond (ms) and 10 milliseconds and of frequency $f_i \in \Omega$ (a previously determined resonant frequency). The frequencies $f_i$, $f_j$ (with i different from j) belong to the subset denoted $\Omega$ of resonant frequencies of the medium.

Figure 4:
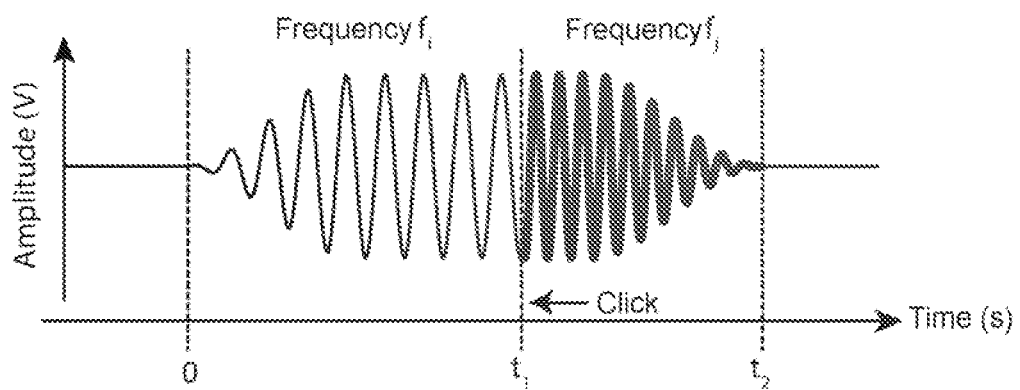
FIGS. 4 and 5 are graphs of amplitude as a function of time and frequency according to other variants of the electrical excitation signal transmitted by the ultrasonic actuators to the haptic medium.

As shown in FIG. 4, the envelope of the electrical excitation signal s(t) may be modulated by convolution with another signal, a Gaussian signal for example, this having the effect of modifying the amplitude of the excitation signal during the time window $(0, t_2)$. By modifying the amplitude of the various wave trains in this way, differentiated key-click sensations are obtained.

Other variants are obtainable, in particular by modifying the form and the duration of the excitation signals of different frequencies used.

According to one variant (not shown), it is for example possible to leave a dead time between two successive wave trains of the electrical excitation signal s(t). This dead time without excitation then has a duration comprised between 0.1 ms and 15 ms.

Figure 5:
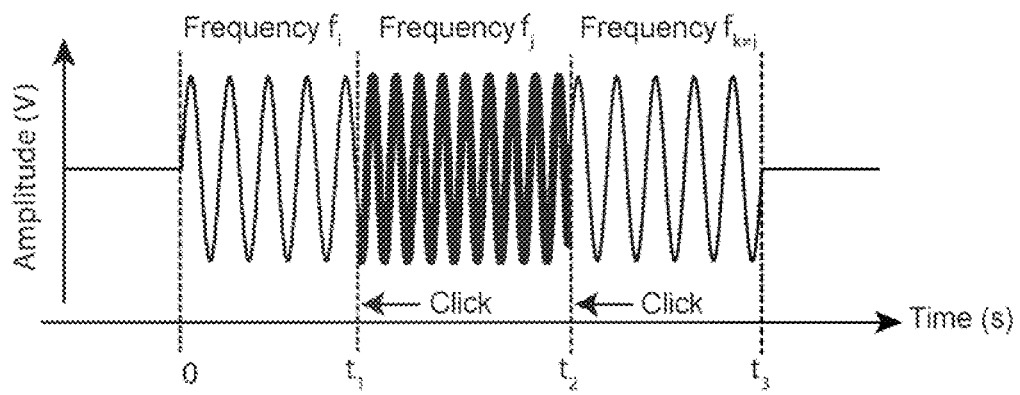

Alternatively, it is possible to use an electrical excitation signal s(t) comprising more than two successive wave trains at different resonant frequencies. A key-click effect is then obtained on each frequency transition. For example, as represented in FIG. 5, a first transition from the frequency $f_i$ to the frequency $f_j$ causes a first key-click effect, and a second transition from the frequency $f_j$ to the initial frequency $f_i$ (or to a third frequency $f_k$ different from the second frequency $f_j$) causes another key-click sensation. In this way, it is possible to obtain different key-click renditions: for example a key click that is relatively sharp, marked, briefi soft, etc.

One embodiment of the system for implementing the method according to the invention may then include a parameterization interface allowing the user to modulate the key-click sensation at his convenience, by choosing from a plurality of pairs or multiplets of resonant frequencies pre-associated with various click sensations.

The electrical amplitude of the signal s(t) sent must be chosen so as to obtain a movement of at least 1 µm in the location where the finger touches the haptic interface. This amplitude in particular depends on the number of actuators used, on their positions, on their efficiencies, and on the mechanical coupling between said actuators and the haptic interface.

Regarding the choice of the time of transmission of the haptic sequence, there are a number of possibilities. The general idea consists in sending the electrical signal s(t) during an action on the part of the user, i.e. during a static touch between the finger and the haptic medium.

A first possibility consists in detecting, for example using a capacitive touch screen, the contact of the finger on the haptic surface and in triggering the transmission of the haptic sequence when the finger of the user makes contact with the surface, in a predefined region thereof. It may for example be a region of the haptic interface displaying a virtual button or a key of a virtual keyboard or even an icon associated with an action or with a function.

Figure 6:
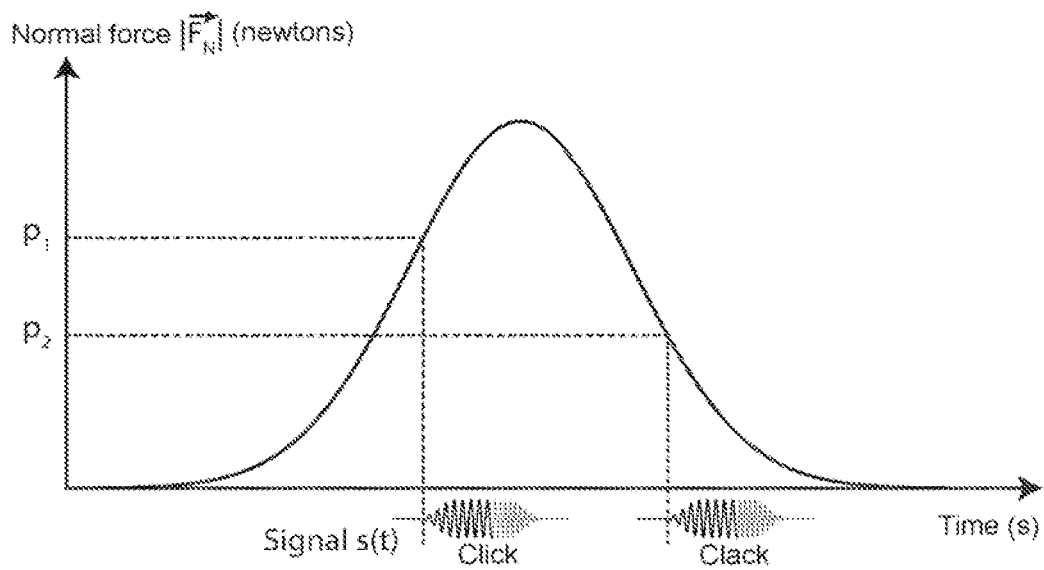
FIG. 6 shows the response of a haptic medium excited using the method according to the invention for two presses of a finger reaching two different force plateaus.

A second possibility, schematically shown in FIG. 6, consists in equipping the haptic interface 20 with a force sensor and in triggering the transmission of the haptic sequence when the normal force $F_N$ exerted by the finger on the surface of the interface exceeds a certain threshold value.

Use of a force sensor moreover allows the obtained haptic effect to be refined as an electrical excitation signal s(t) having a first haptic sequence generating a first key-click effect may then be transmitted when the normal pressing force of the finger on the medium crosses a first threshold value denoted P1, then a second haptic sequence generating a second key-click effect identical to the first key-click effect may be transmitted as soon as the pressing force exceeds a second threshold value denoted P2 (which may be lower or higher than P1)). The second haptic sequence may also be configured to generate a second key-click effect different from the first. In other words, a "key click-clack" effect is obtained.

Figure 7:
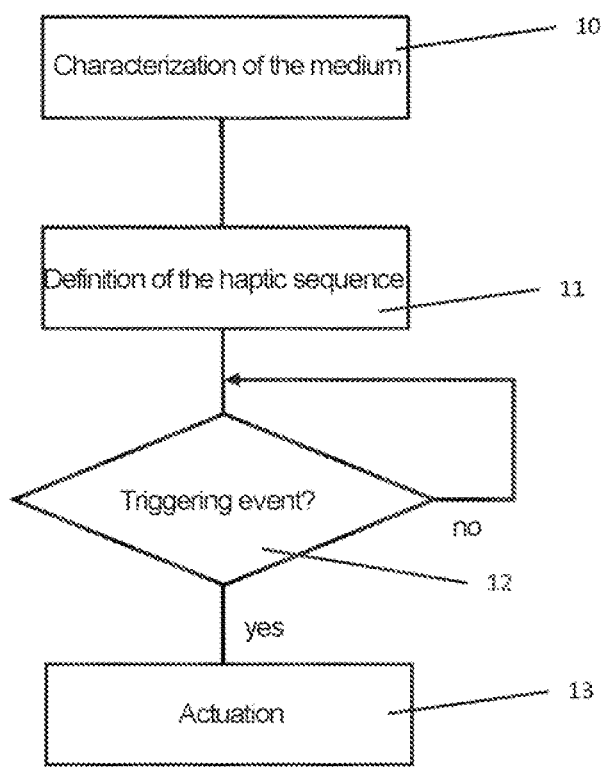
FIG. 7 shows a flowchart of the steps of the method according to the invention.

In FIG. 7, the steps of the method that are required to generate a key-click effect according to the invention have been summarized in the form of a flowchart.

As indicated above, in a first step 10 it is necessary to carry out a physical characterization of the medium of the haptic interface, in order to determine in particular a subset $\Omega$ of its resonant frequencies.

Next, in a second step 11, a haptic sequence, namely the signal s(t) used to control or excite the actuators, which must cause the haptic medium to vibrate to obtain the desired key-click effect, is defined. As explained above, it is a question of a periodic, sinusoidal for example, signal having a transition between at least two different ultrasonic frequencies corresponding to resonant frequencies determined during the characterizing step 10 and that induce standing waves in the medium.

Next, the method enters into a test loop 12 that consists in continuously checking whether a user is interacting with the haptic interface, for example by placing a finger on it. To this end, either a contact is detected (by means for example of capacitive sensors placed on the surface) or the fact that a contact force has reached a predefined threshold is detected (by means of force sensors placed on the haptic interface).

In case of detection of an action on the part of a user, the method initiates, in step 13, the haptic sequence previously defined in step 11, this leading to generation of a high-quality key-click effect that is clearly perceptible by the user, more or less as the fact of pressing on a button or a key of a tangible physical keyboard would be.

Figure 8:
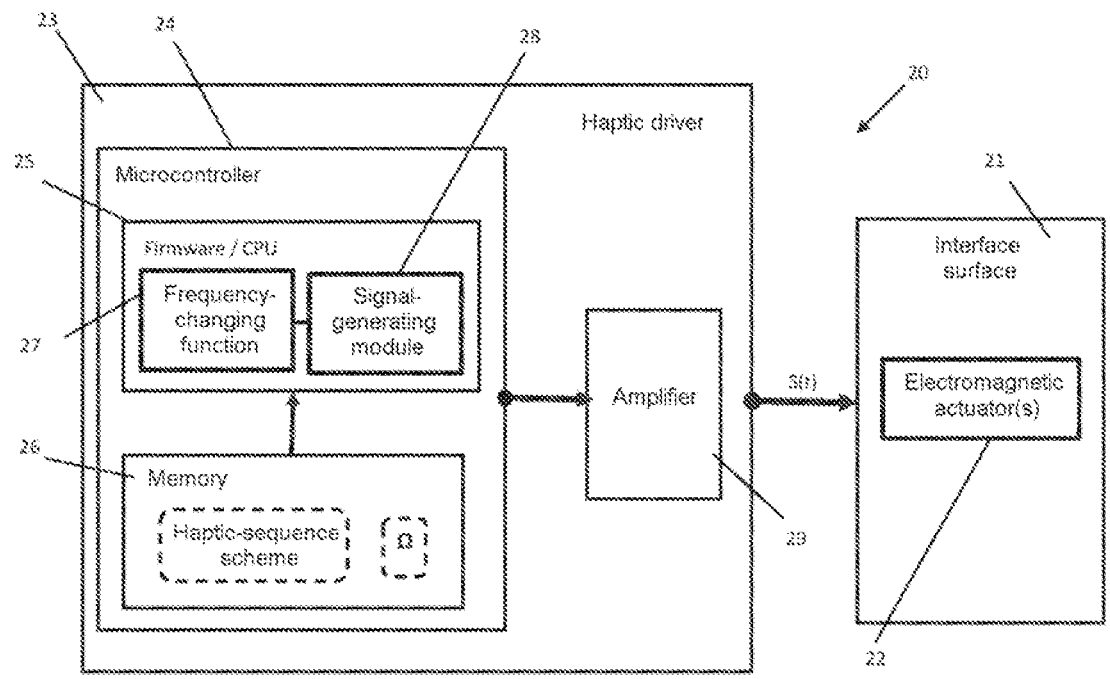
FIG. 8 shows a block diagram of a system configured to implement the method according to the invention.

FIG. 8 shows a block diagram of a haptic device 20 arranged to implement the method according to the invention. It comprises a haptic-interface surface 21, equipped with a certain number of electromechanical actuators 22, for example piezoelectric actuators 22 compatible with actuation frequencies comprised between 20 kHz and 200 kHz. These are preferably placed linearly so as to create plane waves, this allowing, at a given time, the same actuation frequencies ($f_i$) to be used for all the actuators and the same key-click feeling to be obtained at every point on the haptic surface.

The signal s(t) used to excite the actuators 22 is generated by control electronics 23 placed for example under the haptic surface. They comprise a power supply (not shown) and a microcontroller 24. The latter incorporates a processor 25 comprising a firmware package provided with a function 27 for changing vibrational frequency, which function is called by a module 28 for generating a haptic sequence using at least two resonant frequencies. The sequence s(t) is transmitted by the microcontroller 24 to an amplifier 29, which forms and amplifies the control signal s(t) transmitted to the actuators 22, in order to cause the surface to vibrate and create haptic feedback of key-click type.

Various haptic sequences and the subset Ω of resonant frequencies are stored in a memory 26 that is connected, via a two-way connection, to the processor 25.

The haptic interface 20 may usefully comprise a parameterization interface (not shown) that allows the user to choose system parameters such as the waveform of the periodic signals, pairs of resonant frequencies ($f_i$, $f_j$), or even triplets or multiplets of resonant frequencies, the duration of time windows of the haptic sequence and/or the duration of any dead time between two wave trains, and to test the influence of the various parameters on the quality of the obtained key-click effect.

Advantages of the Invention

The invention meets the stated aims. In particular, it has the advantage of being able to be implemented in any pre-existing ultrasonic haptic device without notable modification of the hardware, provided that the actuation chain is capable of generating micron-size vibrations at the frequencies of interest. Only the firmware needs to be modified, the latter having to be configured to implement the described method, and in particular to generate haptic sequences using a plurality of resonant frequencies of the medium.

As a result thereof, unlike known haptic devices using a vibrotactile technology, it will be possible, by virtue of the invention, to create fine textures using the squeeze-film effect and to obtain a key-click effect with one and same hardware architecture, namely the medium, the actuators and their control electronics.

Unlike known methods using an ultrasonic technology requiring the haptic surface to be entirely covered with actuators to obtain a key-click effect, the method according to the invention does not require a high density of actuators, for example a line of actuators distributed along one edge of a rectangular surface may be all that is required. The actuators do not need to generate vibrations of high amplitudes, of the order of 25 microns, an amplitude of the order of one micron being all that is required, this minimizing the required electrical power.

Nonetheless, the key-click effect felt with the method according to the invention is stronger and of higher quality than with the methods available in the prior art.

Furthermore, the key-click effect obtained by virtue of the invention is more robust, i.e. not very sensitive to the way in which the finger is placed on the medium, and it is a question of a more natural key click, which does not require any tangential movement of the finger of the user over the surface of the haptic interface.

The invention claimed is:

1. A method for producing haptic feedback via a squeeze-film effect on a haptic interface equipped with electromechanical actuators that are configured to apply, to said haptic interface, ultrasonic vibrations able to create standing waves at resonant frequencies of the haptic interface, comprising the steps of:
    a. in a preliminary phase of characterization of the haptic interface, determining a subset of resonant frequencies $f_i$ of the haptic interface in the ultrasonic domain;
    b. defining a haptic sequence consisting of an electrical excitation signal s(t) formed by at least two successive periodic signals constituting wave trains of respective frequencies $f_i$, $f_j$ that are different from each other and that belong to said subset of resonant frequencies of the haptic interface, wherein two successive wave trains of the signal s(t) are separated by a dead time without excitation, of a duration between 0.1 ms and 15 ms;
    c. in a phase of use, detecting a static touching action of a user on a region of a surface of the haptic interface; and
    d. in response to said detection, exciting the electromechanical actuators using said electrical excitation signal s(t), so as to achieve a transition from a first standing wave to a second standing wave on the haptic surface, to produce, on the haptic surface, lateral forces that cause the user to feel a key-click sensation.

2. The method as claimed in claim 1, wherein said standing waves are plane waves.

3. The method as claimed in claim 1, wherein said standing waves have a half-wavelength (node-antinode distance) less than the size of the region of contact of a finger on the haptic interface.

4. The method as claimed in claim 1, wherein said periodic signals are sinusoidal, square-wave or triangle-wave signals, having an identical amplitude or amplitudes that are differentiated.

5. The method as claimed in claim 1, wherein the electrical excitation signal s(t) is of finite duration $t_2$ and is composed of a first periodic wave train of duration $t_1$ and of frequency $f_i$ corresponding to a first resonant frequency of the medium, followed by a second periodic wave train of duration $t_2-t_1$ and of frequency $f_j$ corresponding to a second resonant frequency of the medium, which second resonant frequency is different from the first resonant frequency $f_i$.

6. The method as claimed in claim 5, wherein the durations $t_1$ and $t_2-t_1$ are between 0.1 ms and 10 ms.

7. The method as claimed in claim 1, wherein the amplitude of the periodic signals is chosen so that the amplitude of the mechanical vibration of the haptic medium or surface corresponding to the generated key-click effect is less than 3 micrometers.

8. The method as claimed in claim 1, wherein the electrical excitation signal s(t) comprises a plurality of frequency transitions.

9. The method as claimed in claim 1, wherein the haptic interface has a touch surface, and the step of detecting an action of the user comprises detecting the contact of a finger on the touch surface and triggering the transmission of the electrical excitation signal s(t) when the finger of the user makes contact with said touch surface.

10. The method as claimed in claim 1, wherein the haptic interface comprises contact-force sensors and the step of detecting an action of the user comprises measuring a normal pressing force of the finger of the user on the haptic interface, and in triggering the transmission of the electrical excitation signal s(t) when the normal force exerted by the finger on the surface of the haptic interface exceeds a certain predetermined threshold value.

11. A haptic interface comprising a medium having a surface capable of providing haptic feedback to a user acting on this surface by means of at least one contact member, said medium being subjected to ultrasonic vibrations generated by electromechanical actuators fastened to said medium in response to electrical control signals sent to the actuators by control electronics, wherein the control electronics are configured to generate an electrical excitation signal s(t) according to the method as claimed in claim 1.

12. The haptic interface as claimed in claim 11, wherein the electromechanical actuators are piezoelectric ceramics that transmit periodic vibrations at frequencies between 20 kHz and 200 kHz.

13. The haptic interface as claimed in claim 11, comprising a parameterization interface that allows the user to choose system parameters including the waveform of the periodic signals, the multiplet of resonant frequencies ($f_i$, $f_j$, ...), the duration of time windows of the haptic sequence and/or the duration of any dead time between two wave trains, and to test the influence of the various parameters on the quality of the obtained key-click effect.

* * * * *